(12) United States Patent
Matsui

(10) Patent No.: US 9,560,238 B2
(45) Date of Patent: Jan. 31, 2017

(54) PORTABLE TERMINAL CAPABLE OF DISPLAYING IMAGE, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Kenta Matsui, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/532,334

(22) Filed: Nov. 4, 2014

(65) Prior Publication Data

US 2015/0146219 A1 May 28, 2015

(30) Foreign Application Priority Data

Nov. 25, 2013 (JP) ................................. 2013-242740

(51) Int. Cl.
*G06F 15/00* (2006.01)
*H04N 1/393* (2006.01)
*H04N 1/00* (2006.01)

(52) U.S. Cl.
CPC ........ *H04N 1/3935* (2013.01); *H04N 1/00129* (2013.01); *H04N 1/00244* (2013.01); *H04N 1/00469* (2013.01); *H04N 2201/0094* (2013.01)

(58) Field of Classification Search
CPC .............................................. H04N 2201/0094
USPC .......................................................... 358/1.2
See application file for complete search history.

(56) References Cited

U.S. PATENT DOCUMENTS

2008/0272986 A1* 11/2008 Lee ....................... G06T 3/4092
345/55
2010/0309505 A1* 12/2010 Partridge .............. G06F 21/608
358/1.15

FOREIGN PATENT DOCUMENTS

JP 10285378 A 10/1998

* cited by examiner

*Primary Examiner* — Saeid Ebrahimi Dehkord
(74) *Attorney, Agent, or Firm* — Rossi, Kimms & McDowell LLP

(57) ABSTRACT

A portable terminal that is capable of enlarging and displaying an image with sufficient image quality. An obtaining unit obtains an image having resolution. An instruction unit instructs to enlarge and display the image obtained by the obtaining unit. A display unit enlarges and displays the image obtained by the obtaining unit when the instruction unit instructs to enlarge and display an image having first resolution, and enlarges and displays an image corresponding to the image obtained by the obtaining unit that is received from a server when the instruction unit instructs to enlarge and display an image having second resolution that is lower than the first resolution.

10 Claims, 14 Drawing Sheets

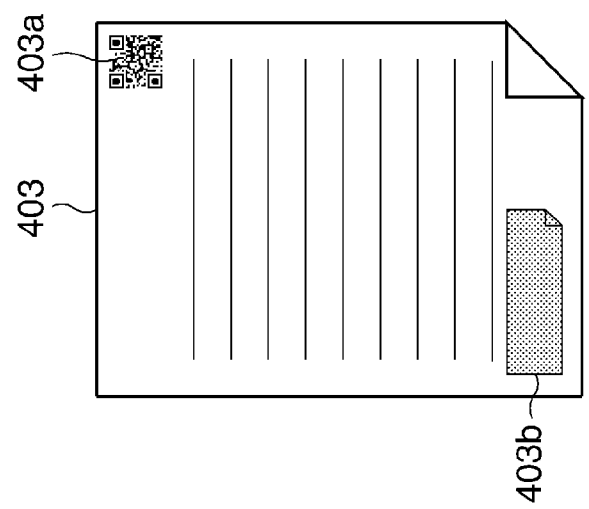
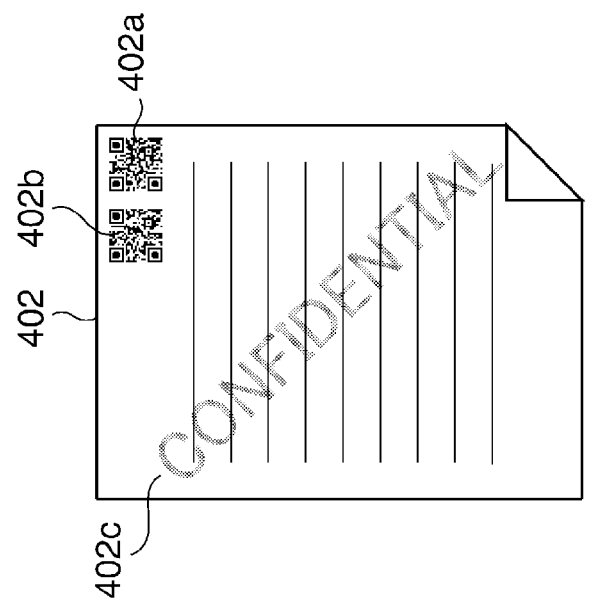
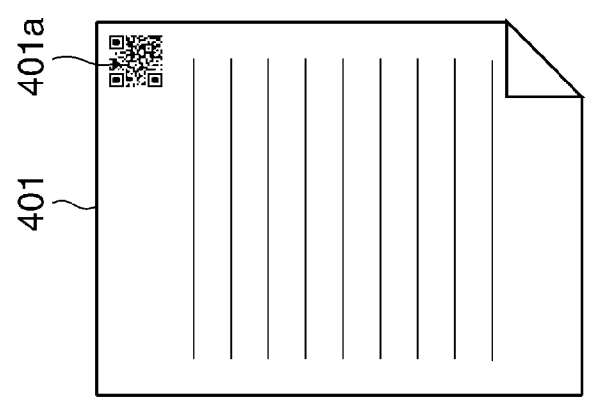

PORTABLE TERMINAL CAPABLE OF DISPLAYING IMAGE, CONTROL METHOD THEREFOR, AND STORAGE MEDIUM STORING CONTROL PROGRAM THEREFOR

BACKGROUND OF THE INVENTION

Field of the Invention

The present invention relates to a portable terminal that is capable of displaying an image, a control method therefore, and a storage medium that stores a control program therefor.

Description of the Related Art

A multifunctional peripheral device equipped with a copy function, a printer function, a facsimile function, a data storage function, etc. has spread as OA equipment in recent years. When copying an original using a multifunctional peripheral device, a user requires quality equivalent to the original for a duplication. However, since a multifunctional peripheral device reads an original image optically with a scanner, digitizes and prints the image, it is difficult to maintain the quality due to noises included during reading and digitization.

There is a known technique that prints a code as identification information with image data for every page, when the image data received from a PC or another multifunctional peripheral device is printed, and that stores the image data and the identification information to a database while relating them to each other. According to this technique, when a user copies a printed sheet that has been printed beforehand, the identification information is detected during the scanning. And when the image data corresponding to the identification information is stored in the database, the image data stored in the database is printed instead of the image data obtained by scanning (for example, see Japanese Laid-Open Patent Publication (Kokai) No. H10-285378 (JP H10-285378A)).

In recent years, there is a use case where a printed sheet is taken with a camera of a portable terminal and the taken image data is transmitted to a printer to print if needed.

When an image taken with a portable terminal is enlarged and displayed or is printed, the image quality of the taken image may be insufficient for displaying and printing a detailed portion. However, the technique disclosed in the above-mentioned publication does not suggest cooperation with a portable terminal, and cannot solve this problem.

Moreover, a printing element like a watermark may be added to a printed sheet by a printer driver or a tag may be pasted on a printed sheet by a user. Since the information that is added to the printed sheet by the printer driver or the user later is not included in the database, such a printed sheet cannot be reproduced using the image data with the corresponding identification information stored in the database in the configuration disclosed in the above-mentioned publication.

SUMMARY OF THE INVENTION

The present invention provides a portable terminal, a control method, and a storage medium storing a control program, which are capable of enlarging and displaying an image with sufficient image quality.

Accordingly, a first aspect of the present invention provides a portable terminal comprising an obtaining unit configured to obtain an image having resolution, an instruction unit configured to instruct to enlarge and display the image obtained by the obtaining unit, and a display unit configured to enlarge and display the image obtained by the obtaining unit when the instruction unit instructs to enlarge and display an image having first resolution, and to enlarge and display an image corresponding to the image obtained by the obtaining unit that is received from a server when the instruction unit instructs to enlarge and display an image having second resolution that is lower than the first resolution.

Accordingly, a second aspect of the present invention provides a control method for a portable terminal comprising an obtaining step of obtaining an image having resolution, an instruction step of instructing to enlarge and display the image obtained in the obtaining step and a display step of enlarging and displaying the image obtained in the obtaining step when it is instructed to enlarge and display an image having first resolution in the instruction step, and of enlarging and displaying an image corresponding to the image obtained in the obtaining step that is received from a server when it is instructed to enlarge and display an image having second resolution that is lower than the first resolution in the instruction step.

Accordingly, a third aspect of the present invention provides a portable terminal comprising an obtaining unit configured to obtain an image, an instruction unit configured to instruct to enlarge and display the image obtained by the obtaining unit, a determination unit configured to determine whether the image obtained by the obtaining unit is difficult to see if enlarged when the instruction unit instructs to enlarge and display the image, and a display unit configured to enlarge and display the image obtained by the obtaining unit when the determination unit determines not to be difficult to see, and to enlarge and display an image corresponding to the image obtained by the obtaining unit that is received from a server when the determination unit determines to be difficult to see.

According to the present invention, when a low resolution image is obtained, the corresponding image is read from the server and is displayed. As a result, the image is enlarged and displayed with sufficient image quality.

Further features of the present invention will become apparent from the following description of exemplary embodiments with reference to the attached drawings.

BRIEF DESCRIPTION OF THE DRAWINGS

FIG. 4A, FIG. 4B, and FIG. 4C are views showing three types of printed sheets printed with the printer shown in FIG. 1.

DESCRIPTION OF THE EMBODIMENTS

Hereafter, embodiments according to the present invention will be described in detail with reference to the drawings.

Figure 1:
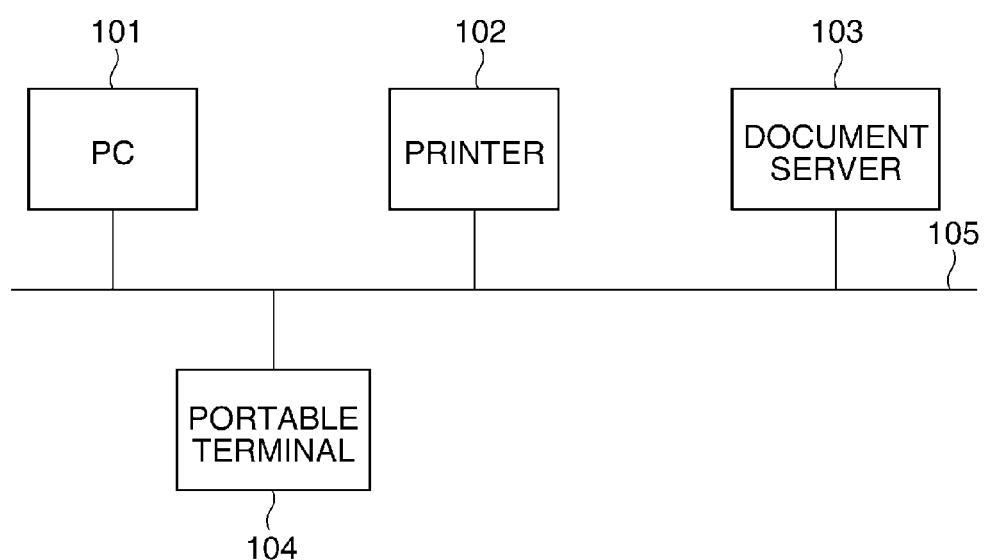
FIG. 1 is a view schematically showing a configuration of an image forming system including a printer as an image forming apparatus according to an embodiment of the present invention.

FIG. 1 is a view schematically showing a configuration of an image forming system 100 including a printer 102 as an image forming apparatus according to an embodiment of the present invention.

As shown in FIG. 1, the image forming system 100 consists of a PC (Personal Computer) 101 as an information processing apparatus, the printer 102, a document server 103, and a portable terminal 104, which are connected via a network 105.

A printer driver is installed in the PC 101. This printer driver transmits print data for printing a document including a character string and an image to the printer 102.

The printer 102 receives print data transmitted from the PC 101 or the portable terminal 104, and prints it.

The document server 103 stores various files relevant to a document. The portable terminal 104 is provided with a camera as a photographing unit.

Figure 2A:
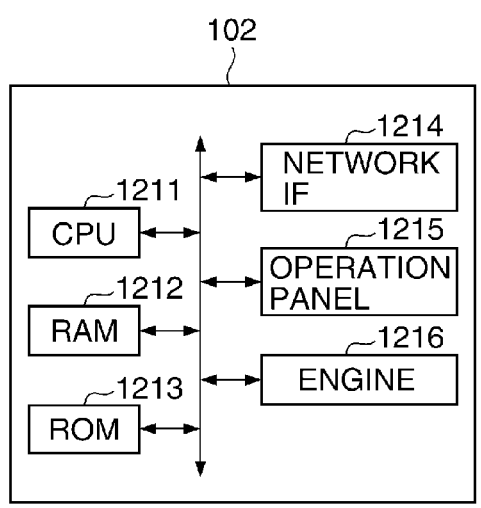
FIG. 2A is a view showing a hardware configuration of the printer shown in FIG. 1.
Figure 2C:
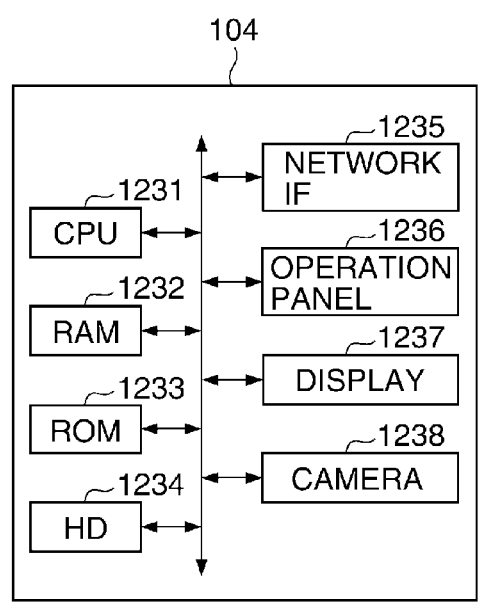
FIG. 2C is a view showing a hardware configuration of a portable terminal shown in FIG. 1.
Figure 2B:
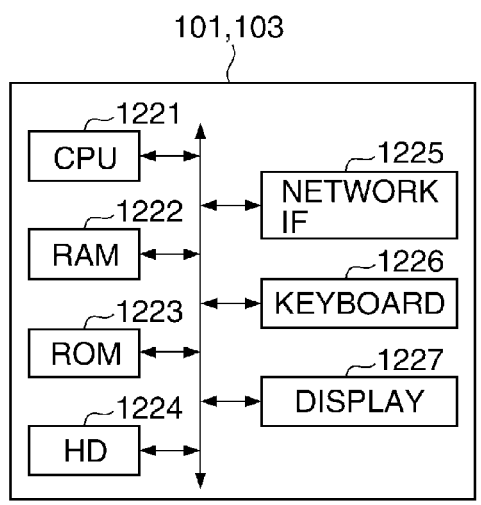
FIG. 2B is a view showing a common hardware configuration of a PC and a document server shown in FIG. 1.

FIG. 2A is a view showing a hardware configuration of the printer 102. FIG. 2B is a view showing a common hardware configuration of the PC 101 and the document server 103. FIG. 2C is a view showing a hardware configuration of the portable terminal 104.

As shown in FIG. 2A, the printer 102 consists of a CPU 1211, a RAM 1212, a ROM 1213, a network interface 1214, an operation panel 1215, and an engine 1216.

The CPU 1211 controls the whole printer 102. The RAM 1012 is used as a work area of the CPU 1211, and stores various programs and various data.

The ROM 1213 stores a boot program and various programs for executing various processes. A below-mentioned flowchart that the printer 102 executes shows a process that is achieved by executing a program, which is stored in the ROM 1213 and is expanded to the RAM 1212, by the CPU 1211.

The network interface 1214 receives input print data to the printer 102. The operation panel 1215 receives an operation by a user, and displays information to a user.

The engine 1216 prints a bitmap image expanded to the RAM 1212 onto a printing sheet.

FIG. 2B shows a common hardware configuration of the PC 101 and the document server 103. Here, the PC 101 will be described as an example.

As shown in FIG. 2B, the PC 101 consists of a CPU 1221, a RAM 1222, a ROM 1223, an HD 1224, a network interface 1225, a keyboard 1226, and a display 1227.

The CPU 1221 controls the whole PC 101. The RAM 1222 is used as a work area of the CPU 1221, and stores various programs and various data.

The ROM 1223 stores a boot program and various programs for executing various processes. A below-mentioned flowchart that the PC 101 executes shows a process that is achieved by executing a program, which is stored in the ROM 1223 and is expanded to the RAM 1222, by the CPU 1221.

The HD 1224 stores files, such as document data. The network interface 1225 connects the PC 101 to the network 105. The keyboard 1226 receives an operation by a user. The display 1227 displays information to a user.

As shown in FIG. 2C, the portable terminal 104 consists of a CPU 1231, a RAM 1232, a ROM 1233, an HD 1234, a network interface 1235, an operation panel 1236, a display 1237, and a camera 1238.

The CPU 1231 controls the whole portable terminal 104. The RAM 1232 is used as a work area of the CPU 1231, and stores various programs and various data.

The ROM 1233 stores a boot program and various programs for executing various processes. A below-mentioned flowchart that the portable terminal 104 executes shows a process that is achieved by executing a program, which is stored in the ROM 1233 and is expanded to the RAM 1232, by the CPU 1231.

The HD 1234 stores files, such as document data. The network interface 1235 connects the portable terminal 104 to the network 105. The operation panel 1236 receives an operation from a user. The display 1237 displays information to a user. The camera 1238 consists of optical elements and a CCD sensor, etc., and is used for taking an image of a subject.

FIG. 3A, FIG. 3B, FIG. 3C, and FIG. 3D are views of software configurations of the printer driver of the PC 101, the printer 102, the document server 103, and the portable terminal 104, respectively. It should be noted that the configurations shown in FIG. 3A, FIG. 3B, FIG. 3C, and FIG. 3D omit software irrelevant to the embodiment.

Figure 3A:
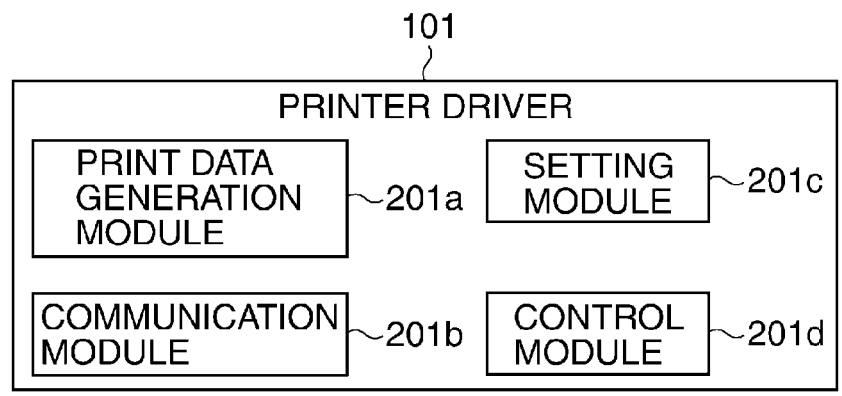
FIG. 3A, FIG. 3B, FIG. 3C, and FIG. 3D are views of software configurations of a printer driver of the PC, the printer, the document server, and the portable terminal, respectively, which are shown in FIG. 1.

As shown in FIG. 3A, the software of the printer driver of the PC 101 consists of a print data generation module 201a, a communication module 201b, a setting module 201c, and a control module 201d.

The print data generation module 201a generates print data from document data. The communication module 201b communicates with other devices. The setting module 201c manages a user's setting. The control module 201d controls the whole printer driver.

Figure 3B:
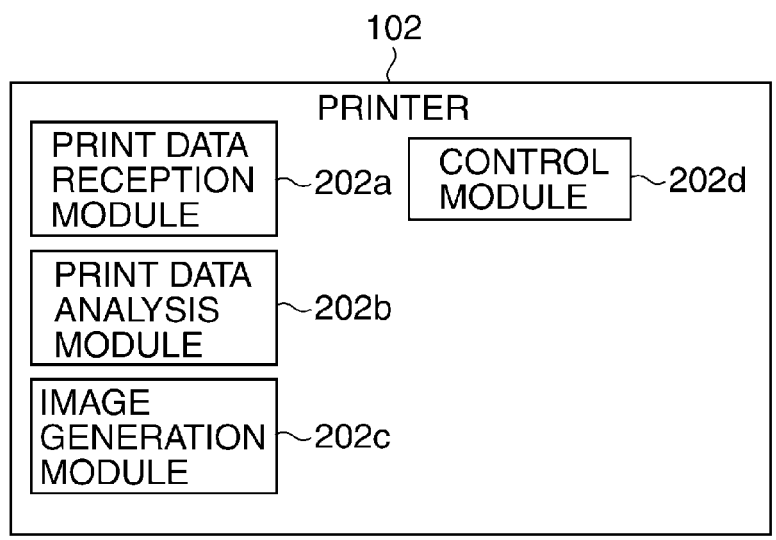

As shown in FIG. 3B, the software of the printer 102 consists of a print data reception module 202a, a print data analysis module 202b, an image generation module 202c, and a control module 202d.

The print data reception module 202a receives print data. The print data analysis module 202b analyzes the print data. The image generation module 202c generates a print image from the analysis result. The control module 202d controls the whole printer 102.

Figure 3C:
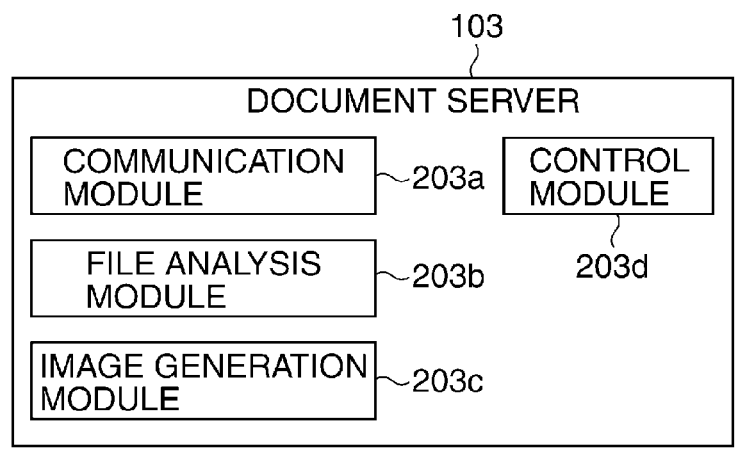

As shown in FIG. 3C, the software of the document server 103 consists of a communication module 203a, a file analysis module 203b, an image generation module 203c, and a control module 203.

The communication module 203a communicates with other devices. The file analysis module 203b analyzes a stored file. The image generation module 203c generates an image from the analysis output. The control module 203d controls the whole document server 103.

Figure 3D:
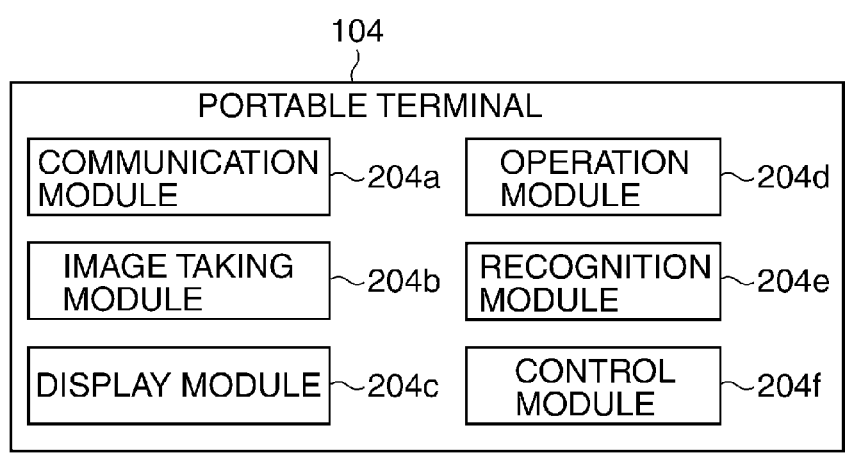

As shown in FIG. 3D, the software of the portable terminal 104 consists of a communication module 204a, an image taking module 204b, a display module 204c, an operation module 204d, a recognition module 204e, and a control module 204f.

The communication module 204a communicates with other devices. The image taking module 204b performs an image taking process. The display module 204c controls the display 1237 to show various kinds of information to a user. The operation module 204d recognizes a user's operation on the operation panel 1236. The recognition module 204e performs an image recognition process. The control module 204f controls the whole portable terminal 104.

Under the above-mentioned configuration, the printer 102 prints three types of printed sheets.

FIG. 4A, FIG. 4B, and FIG. 4C are views showing three types of printed sheets printed by the printer 102.

FIG. 4A is a view showing a printed sheet 401 on which a QR Code (registered trademark) 401a is printed.

FIG. 4B is a view showing a printed sheet 402 on which QR Codes (registered trademark) 402a and 402b, and a watermark 402c are printed.

FIG. 4C is a view showing a printed sheet 403 on which a QR Code (registered trademark) 403a and a tag 403b are printed.

The QR Codes (registered trademark) 401a, 402a, 402b, and 403a in FIG. 4A, FIG. 4B, and FIG. 4C show the file paths that specify stored locations of the document data and the watermark data in the printed sheets. It should be noted that the document data in the embodiment shows electronic data that is used by the printer 102 to print the printed sheet. Moreover, a code like a barcode other than a QR Code (registered trademark) may be used as long as it is possible to specify a file path.

Hereinafter, processes corresponding to the printed sheets 401, 402, and 403 will be described in order.

The processes in the printer driver, the portable terminal 104, and the document server 103 corresponding to the printed sheet 401 will be described first.

Figure 5:
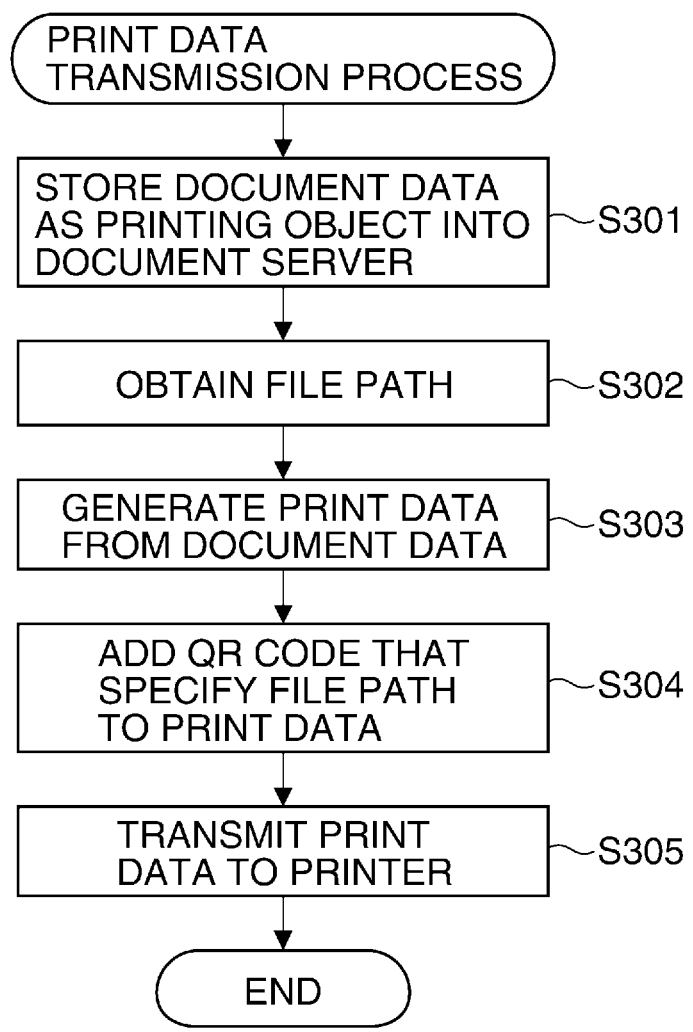
FIG. 5 is a flowchart showing procedures of a print data transmission process executed by the printer driver of the PC shown in FIG. 1 for the printed sheet in FIG. 4A.

FIG. 5 is a flowchart showing procedures of a print data transmission process executed by the printer driver for the printed sheet 401 in FIG. 4A.

As shown in FIG. 5, the control module 201d requests the document server 103 to store document data as a printing object using the communication module 201b, and makes the document server 103 store a file of the document data (step S301).

Next, the control module 201d obtains the file path that specifies the stored location of the document data from the document server 103 (step S302). This file path corresponds to specifying information that specifies document data.

The print data generation module 201a generates print data that is printed by the printer 102 from the document data of the printing object (step S303).

The print data generation module 201a adds the QR Code (registered trademark) that specifies the file path obtained in the step S302 to the print data (step S304).

Then, the control module 201d transmits the generated print data to the printer 102 using the communication module 201b (step S305), and finishes this process.

The printed sheet 401 in FIG. 4A is obtained because the printer 102 receives and prints the print data transmitted in this way.

Figure 6:
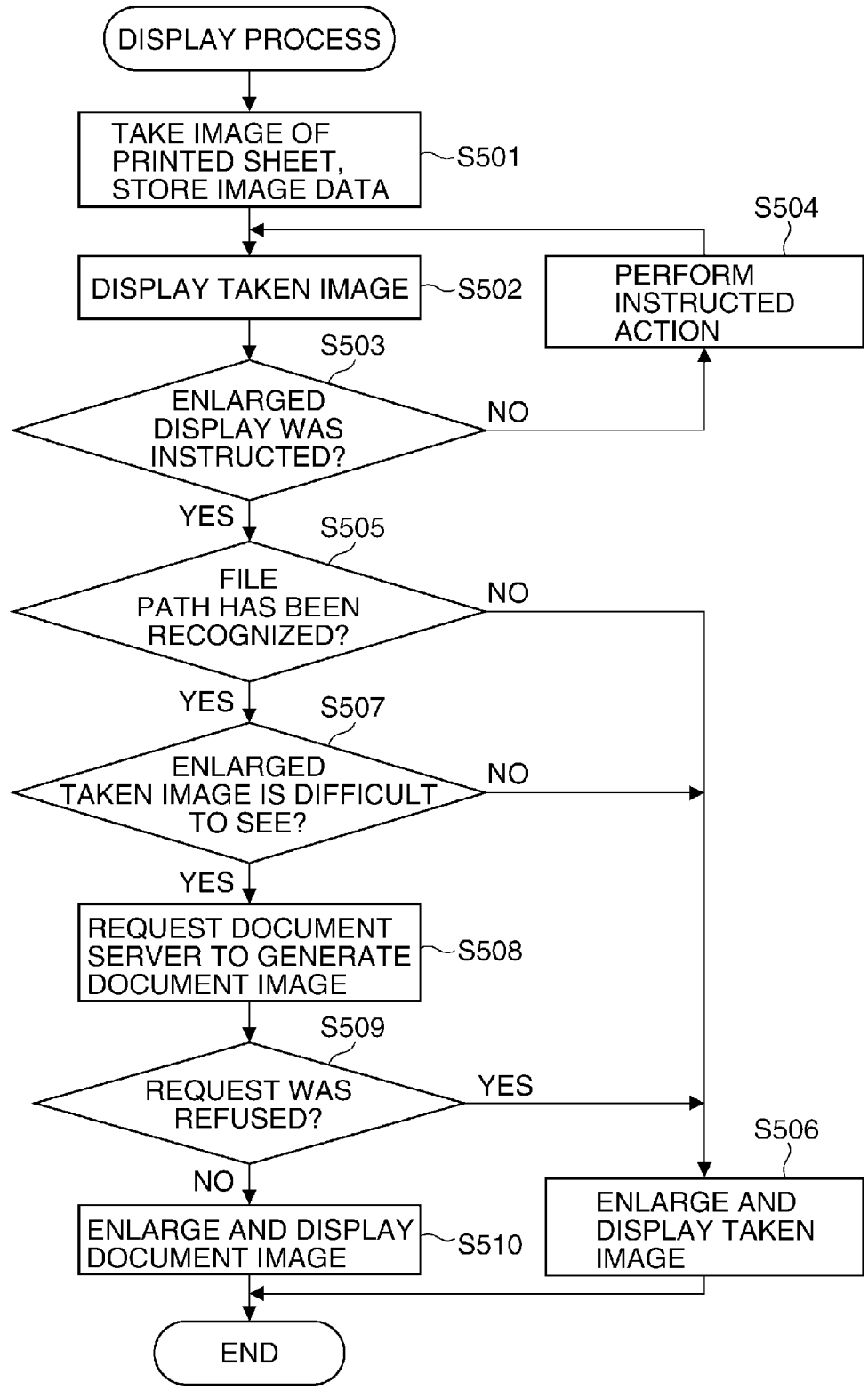
FIG. 6 is a flowchart showing procedures of a display process executed by the portable terminal shown in FIG. 1 for the printed sheet in FIG. 4A.

FIG. 6 is a flowchart showing procedures of a display process executed by the portable terminal 104 for the printed sheet 401 in FIG. 4A.

As shown in FIG. 6, the image taking module 204b takes an image of the printed sheet 401, stores the data of the taken image (step S501). The display module 204c displays the taken image to a user (step S502). This step S501 corresponds to an image taking unit.

Next, the operation unit 204d recognizes a user's operation, and determines whether enlarged display was instructed (step S503).

As a result of the determination in the step S503, when an action other than the enlarged display was instructed (NO in the step S503), the instructed action is performed (step S504), and the process returns to the step S502.

On the other hand, as a result of the determination in the step S503, when the enlarged display was instructed (YES in the step S503), the recognition module 204e determines whether a file path has been recognized from the QR Code (registered trademark) 401a included in the taken image (step S505). This step S503 includes a function of a specifying information obtaining unit that obtains specifying information for specifying the document that should be obtained from the document server on the basis of the obtained image.

As a result of the determination in the step S505, when a file path has not been recognized (NO in the step S505), the display unit 204c enlarges and displays the image taken in the step S501 (step S506), and finishes this process.

On the other hand, as a result of the determination in the step S505, when the file path has been recognized (YES in the step S505), the control module 204f determines whether the enlarged taken image is difficult to see (step S507). The determination criteria in this step will be described below.

As a result of the determination in the step S507, when the enlarged taken image is not difficult to see (NO in the step S507), the process proceeds to the step S506.

On the other hand, as a result of the determination in the step S507, when the enlarged taken image is difficult to see (YES in the step S507), the file path recognized in the step S505 is transmitted to the document server 103 using the communication unit 204a to request to generate a document image (step S508). It should be noted that a document image is an image that document data represents.

Next, it is determined whether the document server 103 refused the request (step S509).

As a result of the determination in the step S509, when the document server 103 refused the request (YES in the step S509), the process proceeds to the above-mentioned step S506.

On the other hand, as a result of the determination in the step S509, when the document server 103 did not refuse the request (NO in the step S509), the display module 204c enlarges and displays the document image generated by the document server 103 (step S510), and this process is finished.

The determination criteria about whether the enlarged taken image is difficult to see in the above-mentioned step S507 will be described.

It is determined by comparing the resolution of the taken image and the resolution of the image to be enlarged and displayed in the embodiment. Specifically, when the following condition is satisfied, it is determined that an enlarged image is difficult to see.

"Required Resolution of Enlarged Display">"Resolution of Taken Image"*2

For example, when the required resolution of enlarged display is 600 dpi and the resolution of a taken image is 400 dpi, the above-mentioned condition is not satisfied because 600<400*2 (=800), and it is determined that the enlarged taken image is sufficient to see.

On the other hand, when the required resolution of enlarged display is 600 dpi and the resolution of a taken image is 100 dpi, the above-mentioned condition is satisfied because 600>100*2 (=200), and it is determined that the enlarged taken image is difficult to see.

In this way, when the required resolution to display is less than twice the resolution of the taken image, the taken image is displayed in the required resolution without obtaining a document image. In general, image quality of a document image that is generated from document data as original data of a printed sheet is higher than that of a taken image.

Figure 7:
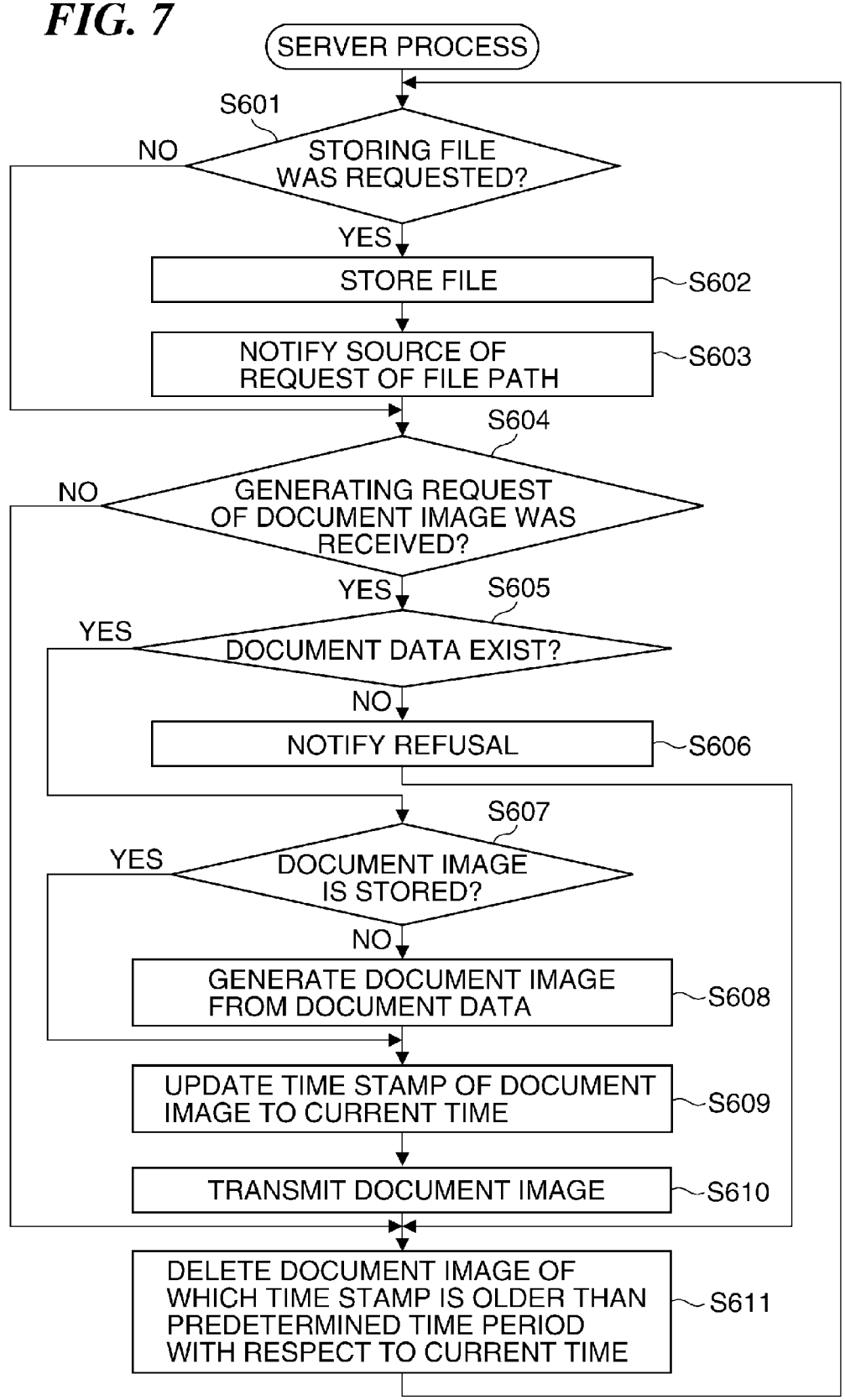
FIG. 7 is a flowchart showing procedures of a server process executed by the document server shown in FIG. 1 for the printed sheet in FIG. 4A.

FIG. 7 is a flowchart showing procedures of a server process executed by the document server 103 for the printed sheet 401 in FIG. 4A.

As shown in FIG. 7, the control module 203d checks the communication unit 203a to determine whether the printer driver requested to store a file of document data (step S601).

As a result of the determination in the step S601, when the printer driver did not request to store a file (NO in the step S601), the process proceeds to step S604.

On the other hand, as a result of the determination in the step S601, when the printer driver requested to store a file (YES in the step S601), the control module 203d stores the file of the document data sent from the printer driver (step S602).

Then, the control module 203d notifies the printer driver, which is the source of the request, of the file path that specifies the stored location of the file using the communication module 203d (step S603).

Next, the control module 203d checks the communication module 203a to determine whether a generating request of a document image with a file path was received from the portable terminal 104 (step S604).

As a result of the determination in the step S604, when a generating request of a document image was not received (NO in the step S604), the process proceeds to step S611.

On the other hand, as a result of the determination in the step S604, when a generating request of a document image was received (YES in the step S604), the control module 203d determines whether the document data specified by the file path received exists (step S605).

As a result of the determination in the step S605, when there is no document data (NO in the step S605), the control module 203d notifies the portable terminal 104, which is the source of the request, of refusal to the request (step S606), and the process proceeds to the step S611.

The document server 103 holds the document image generated according to the request from the portable terminal 104 in a predetermined period. As a result of the determination in the step S605, when document data exists (YES in the step S605), the control module 203d determines whether the document image generated from this document data before is stored (step S607).

As a result of the determination in the step S607, when the document image is stored (YES in the step S607), the process proceeds to step S609.

On the other hand, as a result of the determination in the step S607, when the document image is not stored (NO in the step S607), the file analysis module 203b analyzes the document data, and the image generation module 203c generates a document image on the basis of the analysis result (step S608).

Next, the control module 203d updates the time stamp of the document image to the current time (step S609).

Then, the control module 203d transmits the document image to the portable terminal 104, which is the source of the request, using the communication module 203a (step S610).

Next, the control module 203d deletes a document image of which time stamp is older than a predetermined time period with respect to the current time in order to prevent the number of document images from increasing boundlessly (step S611), and the process returns to the step S601.

When an image that takes a printed sheet is enlarged and displayed according to the processes in FIG. 5 through FIG. 7, the image is enlarged and displayed in high quality because the document image in the document server 103 is used as needed.

Next, processes in the printer driver of the PC 101, the portable terminal 104, and the document server 103 corresponding to the printed sheet 402 shown in FIG. 4B will be described.

Figure 8:
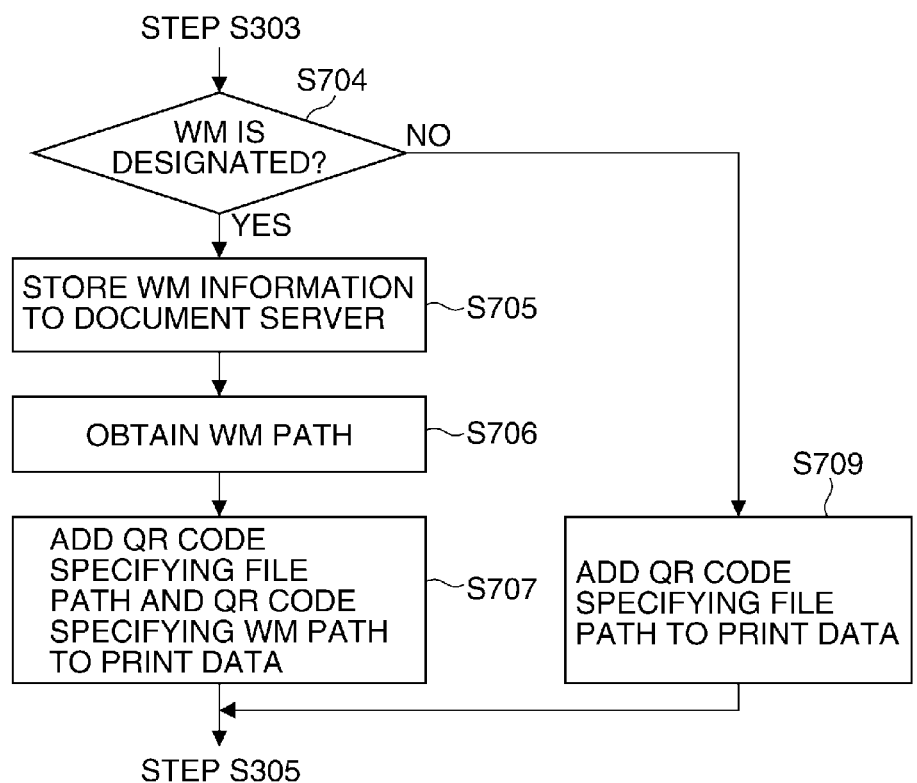
FIG. 8 is a flowchart showing procedures of a print data transmission process executed by the printer driver of the PC shown in FIG. 1 for the printed sheet in FIG. 4B.

FIG. 8 is a flowchart showing a part of procedures of a print data transmission process executed by the printer driver of the PC 101 for the printed sheet 402 in FIG. 4B.

The process in FIG. 8 is inserted between the step S303 and the step S305 in place of the step S304 in FIG. 5. Accordingly, the process after the print data is generated in the step S303 until the print data is transmitted to the printer in the step S305 will be described.

As shown in FIG. 8, the setting module 201c determines whether a watermark (WM) is designated to the document of the printing object after performing the process in the step S303 (step S704).

As a result of the determination in the step S704, when the watermark (WM), which is a composite image, is not designated (NO in the step S704), the print data generation module 201a adds the QR Code (registered trademark) that specifies the file path obtained in the step S302 to the print data (step S709), and the process is finished.

On the other hand, as a result of the determination in the step S704, when the WM is designated (YES in the step S704), the control module 201d requests the server 103 to store the WM information, which is composite image information about a composite image, using the communication module 201b, and makes the document server 103 store the WM information (step S705). It should be noted that the WM information includes information showing the content and the position of the WM.

Next, the control module 201d obtains a file path that specifies the stored location of the WM information as a watermark path from the document server 103 using communication module 201 (step S706). The watermark path that is the file path specifying the stored location of the WM information corresponds to second specifying information.

Then, the print data generation module 201a adds the QR Code (registered trademark) specifying the file path and the QR Code (registered trademark) specifying the watermark path to the print data (step S707), and the process proceeds to the step S305.

The printed sheet 402 in FIG. 4B is obtained because the printer 102 receives and prints the print data transmitted in this way.

The QR Codes (registered trademark) 402a and 402b in the printed sheet 402 specify the file path and the watermark path, respectively. The characters of "CONFIDENTIAL" as the watermark 402c are not included in the original document, and are added by the printer driver and printed.

In this way, according to the embodiment, when a composite image is combined with print data, the composite image information about the composite image is further stored, the second specifying information for specifying the composite image is further obtained, and the image that represents the second specifying information is further added to the print data.

Figure 9:
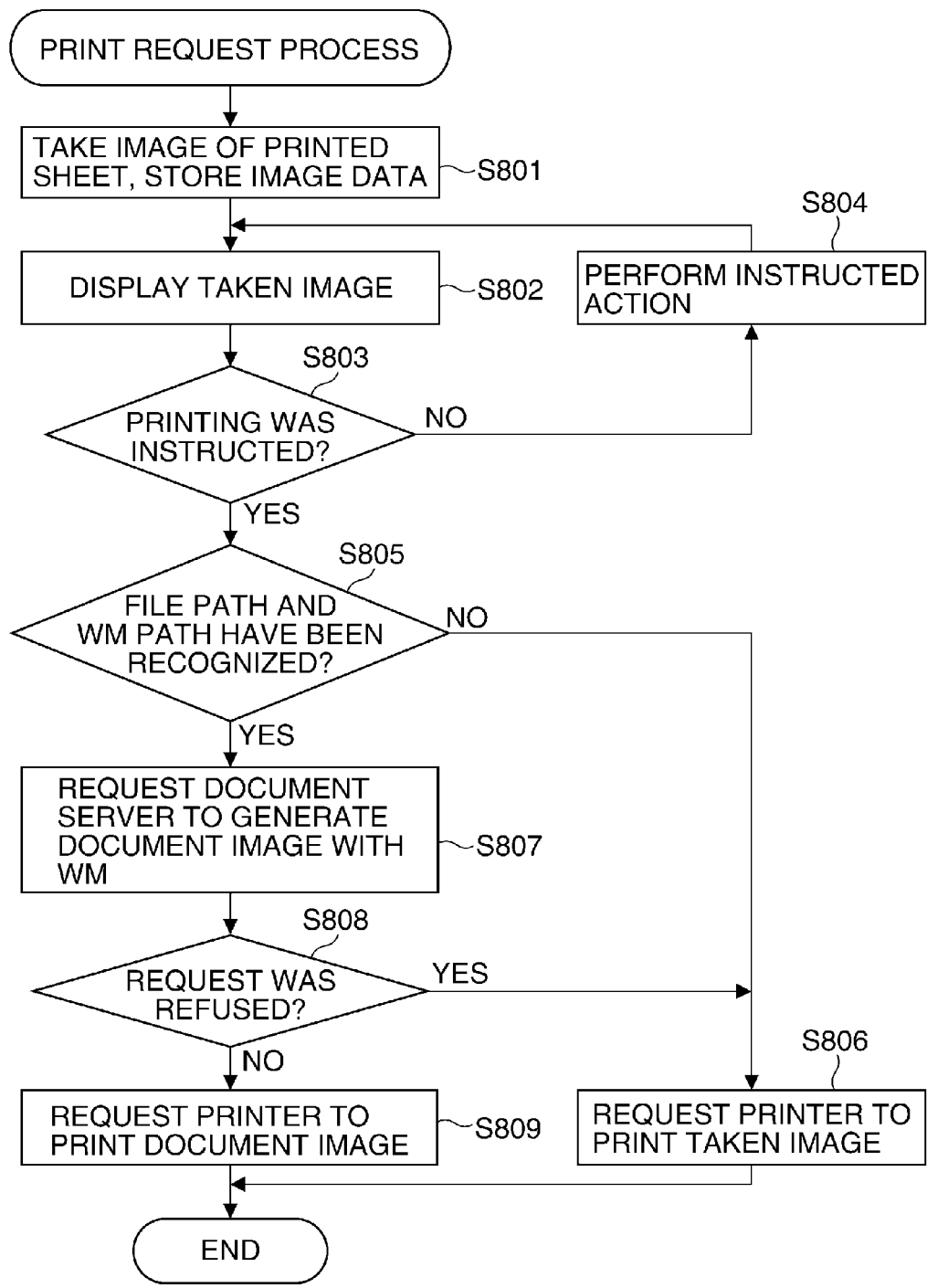
FIG. 9 is a flowchart showing procedures of a print request process executed by the portable terminal shown in FIG. 1 for the printed sheet in FIG. 4B.

FIG. 9 is a flowchart showing procedures of a print request process executed by the portable terminal 104 for the printed sheet 402 in FIG. 4B. It should be noted that FIG. 9 shows the process in which the portable terminal 104 requests the printer 102 to print.

As shown in FIG. 9, the image taking module 204b takes an image of the printed sheet 402, stores the taken image (step S801). The display module 204c displays the taken image to a user (step S802).

Next, the operation unit 204d recognizes a user's operation, and determines whether printing was instructed (step S803).

As a result of the determination in the step S803, when an action other than the printing was instructed (NO in the step S802), the instructed action is performed (step S804), and the process returns to the step S802.

On the other hand, as a result of the determination in the step S803, when the printing was instructed (YES in the step S803), the recognition module 204e determines whether a file path has been recognized from the QR code (registered trademark) 402a included in the taken image and whether a watermark path has been recognized from the QR Code (registered trademark) 402b (step S805).

As a result of the determination in the step S805, when a file path or a watermark path has not been recognized (NO in the step S805), the control module 204f requests the printer 102 to print the image taken in the step S801 (step S806), and finishes this process.

On the other hand, as a result of the determination in the step S805, when the file path and the watermark path have been recognized (YES in the step S805), the control module 204f refers to the file path and the watermark path, and requests the document server 103 to generate a document image with a watermark using the communication module 204a (step S807).

Next, it is determined whether the document server 103 refused the request in the step S807 (step S808).

As a result of the determination in the step S808, when the document server 103 refused the request (YES in the step S808), the process proceeds to the above-mentioned step S806.

On the other hand, as a result of the determination in the step S808, when the document server 103 did not refuse the request (NO in the step S808), the control module 204f requests the printer 120 to print the document image generated by the document server 103 (step S809), and this process is finished. The document image printed at this time is a composite document image that the composite image is combined with the document image.

In this way, according to the embodiment, when the composite image WM combined with the document image is further printed on the printed sheet, the WM information as the second specifying information that specifies the composite image information about the composite image WM is further obtained from the taken image, and composite document image that the composite image is combined with the document image is obtained using the specifying information and the second specifying information.

Figure 10A:
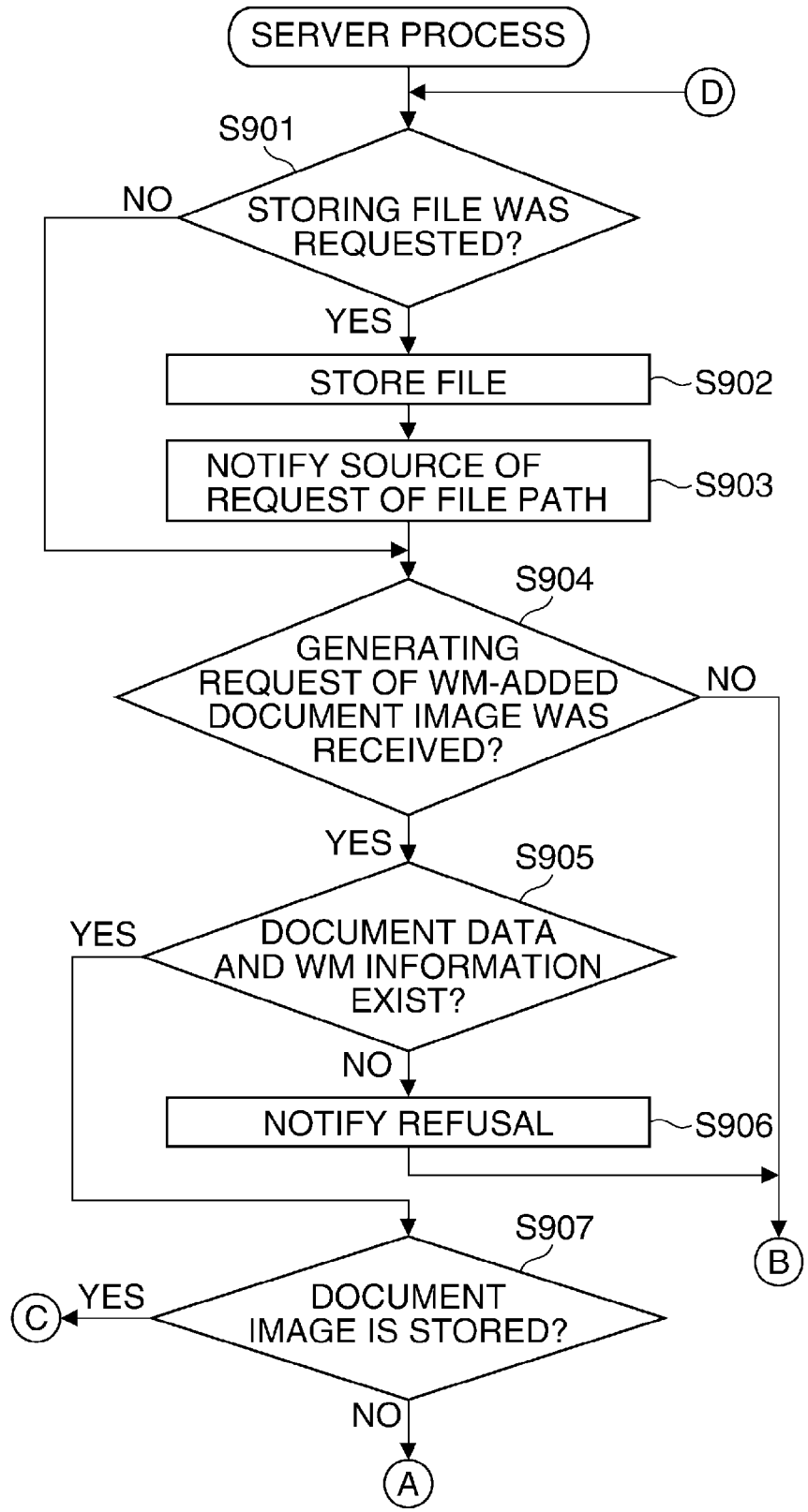
FIG. 10A and FIG. 10B are flowcharts showing procedures of a server process executed by the document server shown in FIG. 1 for the printed sheet in FIG. 4B.
Figure 10B:
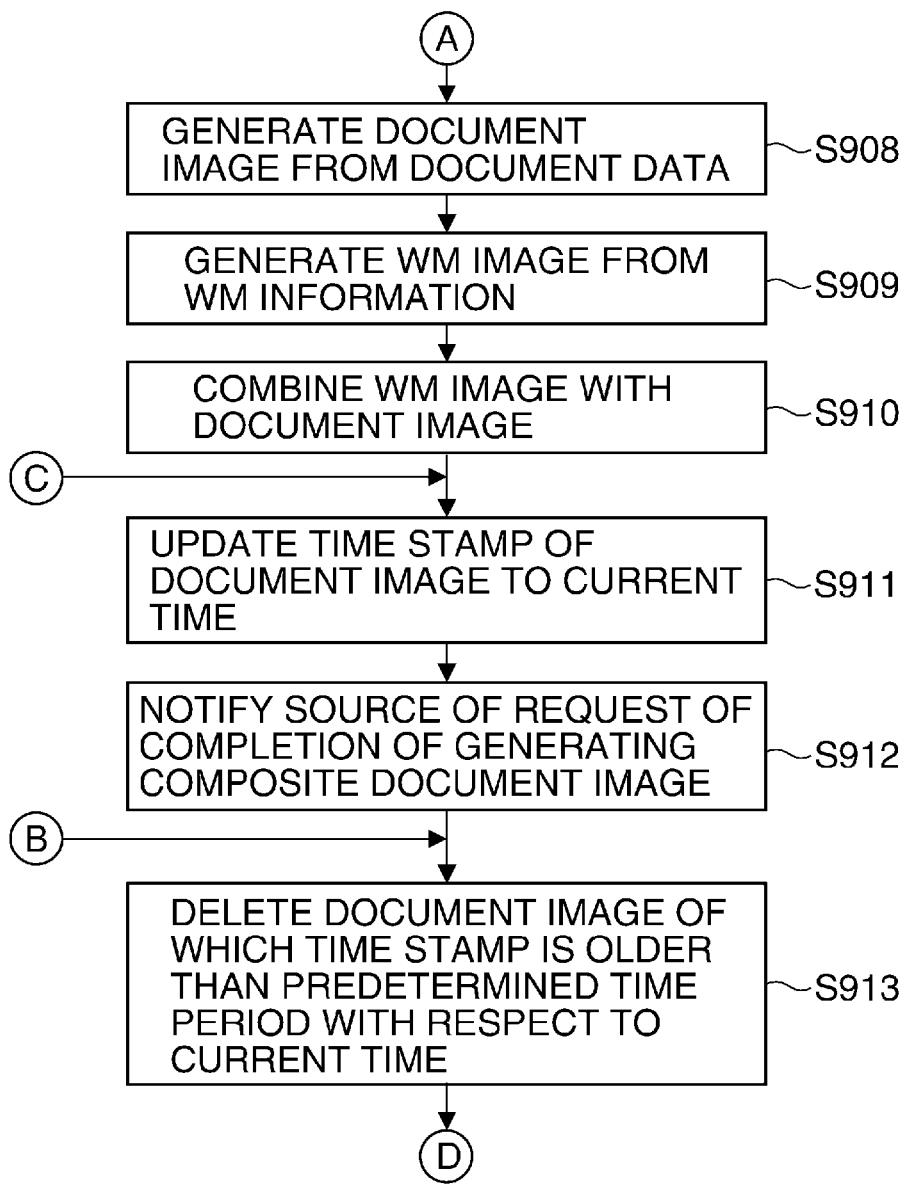

FIG. 10A and FIG. 10B are flowcharts showing procedures of a server process executed by the document server 103 for the printed sheet 402 in FIG. 4B.

As shown in FIG. 10A, the control module 203d checks the communication unit 203a to determine whether the printer driver requests to store a file of document data (step S901).

As a result of the determination in the step S901, when the printer driver does not request to store a file (NO in the step S901), the process proceeds to step S904.

On the other hand, as a result of the determination in the step S901, when the printer driver requests to store a file (YES in the step S901), the control module 203d stores the file of the document data sent from the printer driver (step S902).

Then, the control module 203d notifies the printer driver, which is the source of the request, of the file path that specifies the stored location of the file using the communication module 203a (step S903).

Next, the control module 203d checks the communication module 203a to determine whether a generating request of a WM-added document image with a file path and a watermark path was received from the portable terminal 104 (step S904).

As a result of the determination in the step S904, when a generating request of a WM-added document image was not received (NO in the step S904), the process proceeds to step S913 in FIG. 10B.

On the other hand, as a result of the determination in the step S904, when a generating request of a WM-added document image was received (YES in the step S904), the control module 203d determines whether the document data represented by the file path and the WM information represented by the watermark path received exist (step S905).

As a result of the determination in the step S905, when there is no document data or no watermark information (NO in the step S905), the control module 203d notifies the portable terminal 104, which is the source of the request, of refusal to the request (step S906), and the process proceeds to the step S913.

On the other hand, as a result of the determination in the step S905, when the document data and the WM information exist (YES in the step S905), the control module 203d determines whether the document image generated from these document data and WM information before is stored (step S907).

As a result of the determination in the step S907, when the document image is stored (YES in the step S907), the process proceeds to step S911 in FIG. 10B.

On the other hand, as a result of the determination in the step S907, when the document image is not stored (NO in the step S907), the file analysis module 203b analyzes the document data, and the image generation module 203c generates a document image on the basis of the analysis result (step S908).

Furthermore, the file analysis module 203b analyzes the WM information, and the image generation module 203c generates a WM image on the basis of the analysis result (step S909).

Then, the control module 203d combines the WM image with the document image (step S910).

Next, the control module 203d updates the time stamp of the composite document image to the current time (step S911).

Then, the control module 203*d* notifies the portable terminal 104, which is the source of the request, of the completion of generating the composite document image (WM-added document image) using the communication module 203*a* (step S912). The generated composite document image is transmitted to the printer 102 and is printed. Alternatively, the generated composite document image may be transmitted to the portable terminal 104 and be transmitted to the printer 102 from the portable terminal 104.

Next, the control module 203*d* deletes a document image of which time stamp is older than a predetermined time period with respect to the current time in order to prevent the number of document images from increasing boundlessly (step S913), and the process returns to the step S901.

In this way, according to the embodiment, when generation of a document image is requested with second specifying information that specifies a composite image information, the composite image is generated from the composite image information specified by the second specifying information, the composite document image that the composite image is combined with the document image is further generated, and the composited document image is provided.

According to the processes in FIG. 8 through FIG. 10B, a high-definition print becomes possible even for a printed sheet on which information like a watermark added by the printer driver is added. Moreover, when a composite document image is transmitted to the portable terminal 104, a high-definition enlarged display becomes possible.

Next, processes in the portable terminal 104, and the document server 103 corresponding to the printed sheet 403 shown in FIG. 4C will be described.

Figure 11:
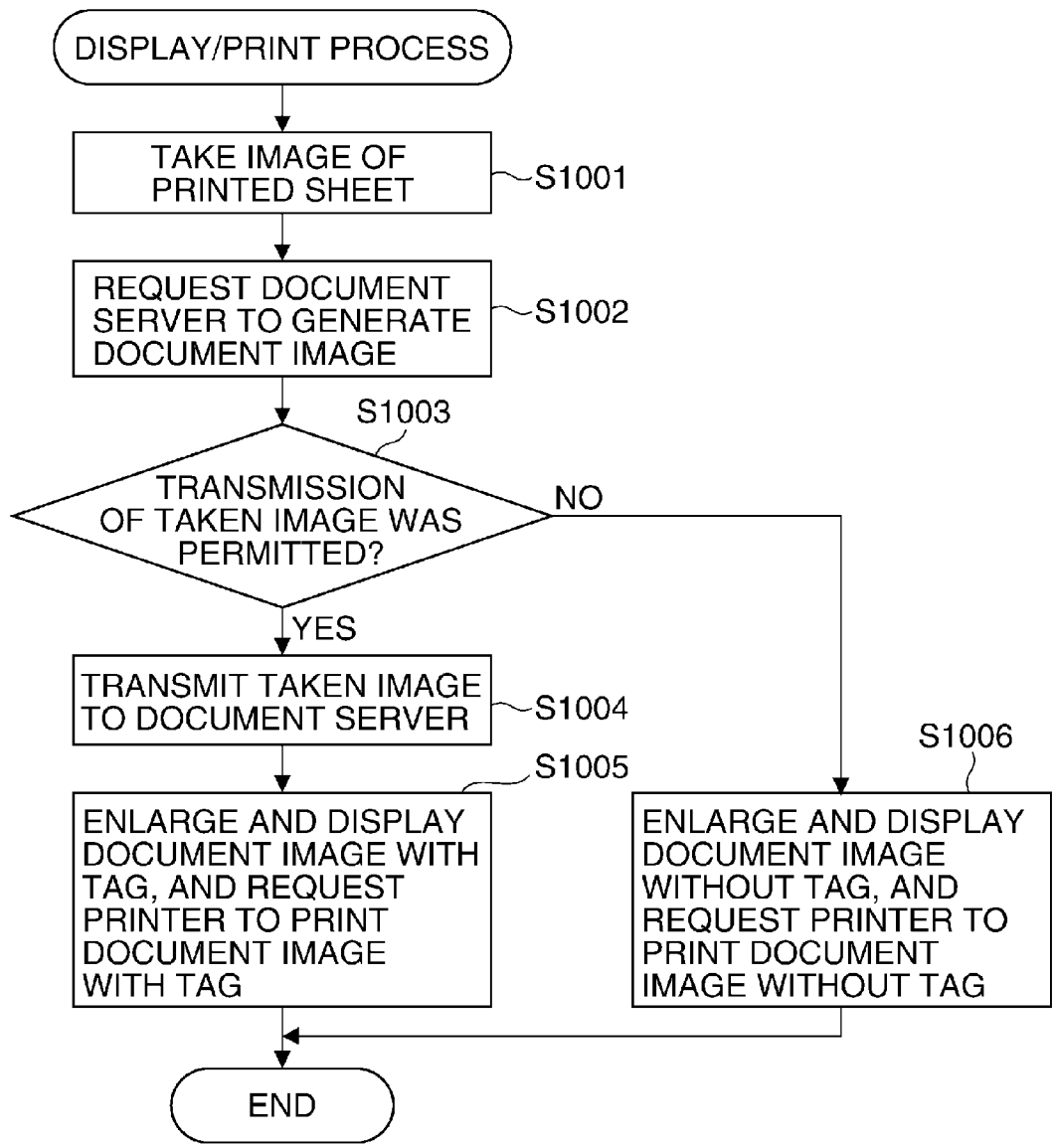
FIG. 11 is a flowchart showing procedures of a display/print process executed by the portable terminal shown in FIG. 1 for the printed sheet in FIG. 4C.

FIG. 11 is a flowchart showing procedures of a display/print process executed by the portable terminal 104 for the printed sheet 403 in FIG. 4C.

As shown in FIG. 11, the image taking module 204*b* takes an image of the printed sheet 403, and stores a taken image (step S1001).

Next, the control module 204*f* recognizes a file path of the printed sheet that is recognized by the recognition module 204*e*, and transmits the recognized file path to the document server 103 using the communication module 204*a* to request the document server 103 to generate a document image (step S1002).

Then, the control module 204*f* determines whether a user permitted transmission of the taken image by an operation to the operation module 204*d* in response to a transmission request of the taken image from the document server 103 (step S1003).

As a result of the determination in the step S1003, when the transmission of the taken image was not permitted (NO in the step S1003), the control module 204*f* enlarges and displays the document image without the tag that was generated by the document server 103, requests the printer 120 to print the document image without the tag (step S1006), and finishes this process.

On the other hand, as a result of the determination in the step S1003, when the transmission of the taken image was permitted (YES in the step S1003), the control module 203*f* transmits the taken image to the document server 103 using the communication module 204*a* (step S1004).

Next, the control module 204*f* enlarges and displays the document image with the tag that was combined by the document server 103, request the printer to print the document image with the tag (step S1005), and finishes this process. The document image displayed and transmitted in the step S1005 is an additional element composite document image that shows a document image to which a new element is added. Although the newly added element is the above-mentioned tag in the embodiment, it may be handwriting characters etc.

Figure 12:
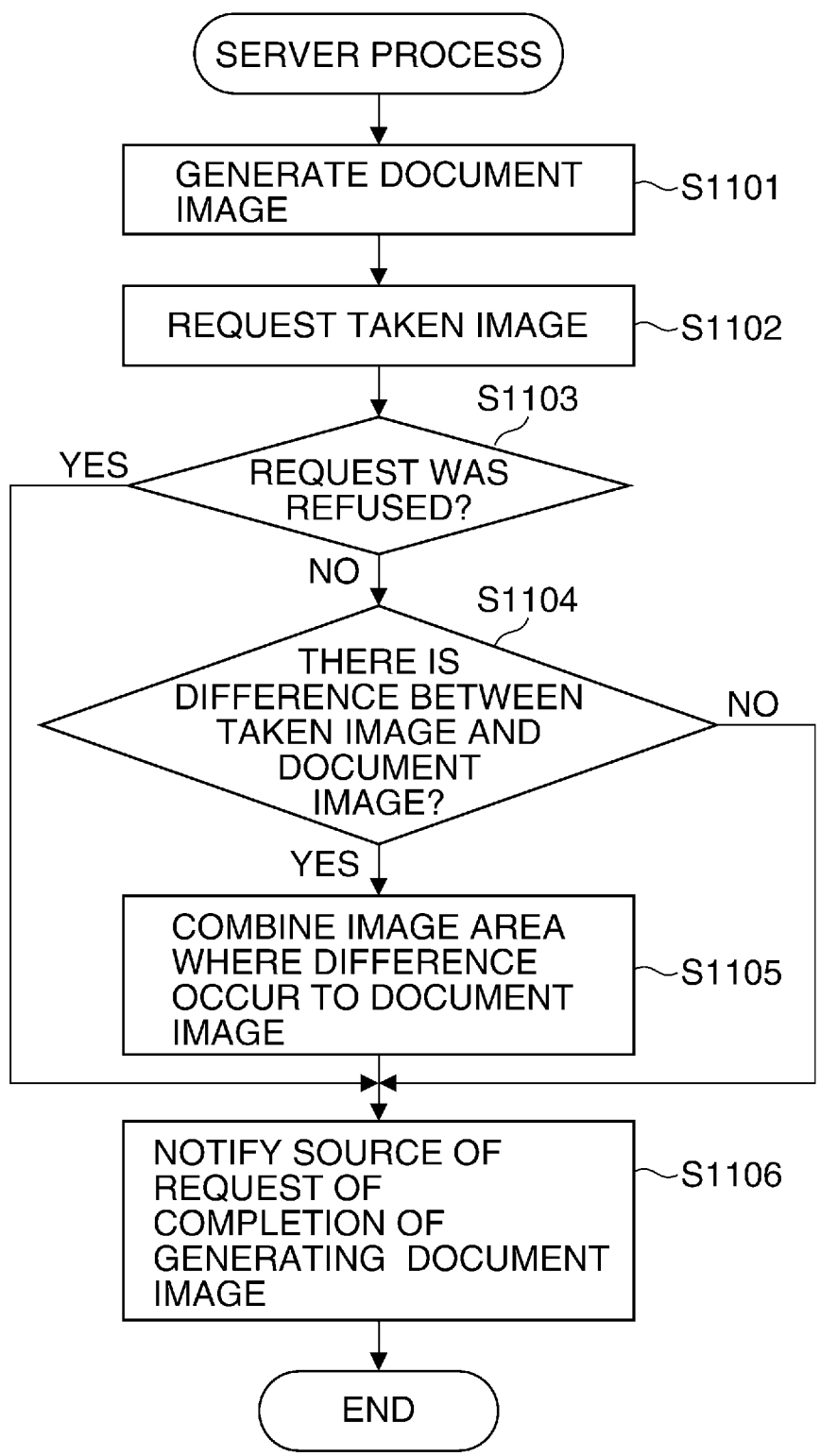
FIG. 12 is a flowchart showing procedures of a server process executed by the document server shown in FIG. 1 for the printed sheet in FIG. 4C.

FIG. 12 is a flowchart showing procedures of a server process executed by the document server 103 for the printed sheet 403 in FIG. 4C.

As shown in FIG. 12, the file analysis module 203*b* analyzes the document data requested by the portable terminal 104, and the image generation module 203*c* generates a document image on the basis of the analysis result (step S1101).

Next, the control module 203*d* requests the taken image from the portable terminal 104 (step S1102).

Then, it is determined whether the request in the step S1102 was refused (step S1103). As a result of the determination in the step S1103, when the request was refused (YES in the step S1103), the process proceeds to step S1106.

On the other hand, as a result of the determination in the step S1103, when the request was not refused (NO in the step S1103), the control module 203*d* determines whether there is a difference between the taken image and the document image(step S1104).

As a result of the determination in the step S1004, when there is no difference (NO in the step S1104), the process proceeds to the step S1106.

On the other hand, as a result of the determination in the step S1104, when there is a difference (YES in the step S1104), the control module 203*d* extracts an image area where the difference occurs from the taken image, and combines the extracted image area to the document image (step S1105). This composition reflects the tag that is only included in the taken image to the document image.

Then, the control module 203*d* notifies the portable terminal 104 of the completion of generating the document image using the communication module 203*a* (step S1106), and finishes this process.

In this way, according to the embodiment, when a taken image that includes an image of a new element added after printing a printed sheet is received, the image area showing the newly added element is extracted by detecting a difference between a document image and the taken image, and an additional element composite document image that the extracted image area is combined with the document image is provided.

According to the processes in FIG. 11 and FIG. 12, a high-definition enlarged display and a high-definition print become possible even for a printed sheet that includes information like a tag added by a user.

According to the embodiment, an image of a printed sheet is taken (the step S501), generation of a document image, which is generated from document data using specifying information that specifies the document data obtained from the taken image, is requested (the step S508), and the generated high-definition document image is enlarged and displayed (the step S510).

In each of the presses for the printed sheets shown in FIG. 4A, FIG. 4B, and FIG. 4C, high-definition enlarged display and high-definition print become possible using a document image of which quality is higher than that of a taken image.

Moreover, according to the embodiment, even if there is information like a watermark or a tag that is added by a printer driver or a user, the enlarged display and the print become possible in consideration of the information.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-242740, filed Nov. 25, 2013, which is hereby incorporated by reference herein in its entirety.

What is claimed is:

1. A portable terminal comprising:
a capturing unit;
a display; and
a processor connected to a memory, the processor and memory configured to:
obtain a captured image of a printed document captured by the capturing unit, wherein location information of original data corresponding to the printed document is printed on the printed document;
receive an instruction to enlarge and display the obtained image;
determine whether the obtained image enlarged in accordance with the instruction satisfies a predetermined image quality;
enlarge and display the obtained image in accordance with the instruction in a case where it is determined that the obtained image enlarged in accordance with the instruction satisfies the predetermined image quality;
acquire, based on the location information printed on the printed document of the captured image, the original data corresponding to the printed document of the captured image, in a case where it is determined that the obtained image enlarged in accordance with the instruction does not satisfy the predetermined image quality; and
regulate a size of the acquired original data and display the regulated data in accordance with the instruction.

2. The portable terminal according to claim 1, the processor and memory further configured to enlarge and display while displaying the obtained image.

3. The portable terminal according to claim 1, wherein a resolution of the acquired original data is higher than a resolution of the obtained image.

4. The portable terminal according to claim 1, the processor and memory further configured to enlarge and display the obtained image on the display irrespective of the print quality of the obtained image enlarged, when the location information is not printed on the printed document captured by the capturing unit.

5. The portable terminal according to claim 1, wherein the printed document comprising a first document object and a second document object, and a first location information of the original data of the first document object and a second location information of the original data of the second document object are printed on the printed document; and
the processor and memory being further configured to:
acquire the original data of at least one of the first document object and the second document object;
control the printer to print a composite document image of at least the first document object and the second object.

6. The portable terminal according to claim 1, wherein the location information is a file path of the original data in a server.

7. The portable terminal according to claim 1, wherein the processor and the memory
determines whether or not a resolution of the obtained image is less than a predetermined resolution,
determines that the enlarged image satisfies the predetermined image quality under at least a condition that the resolution of the obtained image is not less than the predetermined image, and
determines that the enlarged image does not satisfy the predetermined image quality under at least a condition that the resolution of the obtained image is less than the predetermined image.

8. The portable terminal according to claim 1, wherein the processor and the memory
obtains the captured image of a printed document captured by the capturing unit, wherein a bar code to get the original data corresponding to the printed document is printed on the printed document;
acquires, based on the bar code printed on the printed document of the captured image, the original data corresponding to the printed document of the captured image, in a case where it is determined that the obtained image enlarged in accordance with the instruction does not satisfy the predetermined image quality.

9. A control method for a portable terminal including a capturing unit and a display, the control method comprising:
an obtaining step of obtaining a captured image of a printed document captured by the capturing unit, wherein location information of original data corresponding to the printed document is printed on the printed document;
an instruction step of receiving an instruction to enlarge and display the image obtained in said obtaining step;
a determining step of determining whether the obtained image enlarged in accordance with the instruction satisfies a predetermined image quality;
a displaying step of enlarging and displaying the obtained image in accordance with the instruction in a case where it is determined that the obtained image enlarged in accordance with the instruction satisfies the predetermined image quality;
an acquiring step of acquiring, based on the location information printed on the printed document of the captured image, the original data corresponding to the printed document of the captured image, in a case where it is determined that the obtained image enlarged in accordance with the instruction does not satisfy the predetermined image quality; and a regulating step of regulating a size of the acquired original data and displaying the regulated data in accordance with the instruction.

10. A non-transitory computer-readable storage medium storing a control program causing a computer to execute a control method for a portable terminal including a capturing unit and a display, the control method comprising:

an obtaining step of obtaining a captured image of a printed document captured by the capturing unit, wherein location information of original data corresponding to the printed document is printed on the printed document;

an instruction step of receiving an instruction to enlarge and display the image obtained in said obtaining step;

a determining step of determining whether the obtained image enlarged in accordance with the instruction satisfies a predetermined image quality;

a displaying step of enlarging and displaying the obtained image in accordance with the instruction in a case where it is determined that the obtained image enlarged in accordance with the instruction satisfies the predetermined image quality;

an acquiring step of acquiring, based on the location information printed on the printed document of the captured image, the original data corresponding to the printed document of the captured image, in a case where it is determined that the obtained image enlarged in accordance with the instruction does not satisfy the predetermined image quality; and a regulating step of regulating a size of the acquired original data and displaying the regulated data in accordance with the instruction.

\* \* \* \* \*